United States Patent [19]
Godard et al.

[11] 3,863,123
[45] Jan. 28, 1975

[54] SUPPLY SYSTEM FOR AN ASYNCHRONOUS MOTOR

[75] Inventors: Pierre Godard, Tremblay Les Gonesse; Eric Patry, Nogent, both of France

[73] Assignee: Saft-Societe Des Accumulateurs Fixes Et De Traction, Romainville, France

[22] Filed: Nov. 1, 1973

[21] Appl. No.: 411,805

[30] Foreign Application Priority Data
Nov. 6, 1972  France .............................. 72.39208
May 8, 1973  France .............................. 73.16589

[52] U.S. Cl. .................................. 318/440, 307/64
[51] Int. Cl. .............................................. H02p 7/42
[58] Field of Search ........................ 318/105–110, 318/440–442; 307/64, 66, 67; 187/29

[56]  References Cited
  UNITED STATES PATENTS
3,293,445  12/1966  Levy ...................................... 307/66
3,665,495  5/1972  Carter et al ........................... 307/67
3,706,357  12/1972  Simpson ................................ 187/29

Primary Examiner—Robert K. Schaefer
Assistant Examiner—W. E. Duncanson, Jr.
Attorney, Agent, or Firm—Kenyon & Kenyon Reilly Carr & Chapin

[57]  ABSTRACT

A supply system for an asynchronous multi-phase motor used to operate mechanism such as elevators, cranes, drawbridges or the like including a main a. c. power supply source and circuit for operating the motor and an auxiliary d. c. source convertible to an auxiliary power supply for the motor at lower frequency and voltage than those of the main power supply. The d. c. supply source may be either a battery or rectified a. c. This d. c. source is converted into a. c. of lower voltage and frequency than the main a. c. power supply by an undulator or low frequency oscillator and provides low frequency a. c. voltage of lower value than the main a. c. power supply source to operate the motor either on failure of main a. c. power or at slow speeds in requisite directions needed to arrive at the desired stop position of the mechanism which the motor operates. If the battery constitutes the d. c. supply source, its recharging may be effected during non-emergency periods by rectified current from the main a. c. supply source.

30 Claims, 6 Drawing Figures

SUPPLY SYSTEM FOR AN ASYNCHRONOUS MOTOR

RELATED APPLICATIONS

No related applications are co-pending.

BRIEF SUMMARY OF INVENTION

The invention concerns a supply device for an asynchronous motor comprising an alternating current source used for normal supplying and a direct current source used for extra supplying in combination with an undulator or oscillator.

For reasons of continuity of operation or emergencies in the case of a breakdown of the power distribution system, two electrical supply systems are often provided. Known means consist in replacing the defective power distribution system by a self-contained supply system having a voltage and frequency identical to those of the normal power distribution system. Electrical generator units and charger-battery undulator assemblies are cited by way of example.

Among emergency operations, the following examples may be cited:

Resetting of passenger and freight elevators to a selected level;

Powering of lifting devices and belt conveyors or bucket elevators;

Ending the operation of a lock, of a swing-bridge, lifting bridge or traverser, of a railway turntable, or of a rolling door;

Circulating of a fluid powered by a volumetric pump, more particularly lubricating an assembly of the turbo-alternator unit type until the latter stops completely. If the fact that often, the emergency operation consists only in ending a movement and resetting a device in its rest position is taken into consideration, conventional solutions seem fairly expensive.

Moreover, speed variators for asynchronous motors which enable the speed of the operations carried out under the action of the motor to be reduced are known, these speed variators are complicated and expensive.

The invention concerns a more economical device for the double supplying of an asynchronous motor which is characterized in that the undulator or oscillation is designed to oscillate according to an inherent frequency which is substantially lower than the frequency of the normal supply and in that its output voltage is a fraction of the normal supply voltage.

To great advantage, the ratio between the output voltage of the undulator and its frequency is approximately identical to the ratio between voltage and frequency of the normal source.

According to a preferred embodiment of the invention, the undulator or oscillator also comprises means enabling the overvoltages produced by the motor to be absorbed.

In the particular case where the direct current source is constituted by a battery, the said means enable the battery to be recharged when the motor operates as a generator.

Moreover, the undulator comprises a circuit called a "time base circuit" which provides a pulse train whose frequency is higher by a factor $2n$ than the inherent frequency of the undulator, $n$ being the number of phases of the motor. It is useful, in certain cases, to increase the torque when starting up the motor by a means enabling the undulator to operate during a first period after the energizing of the device at lower frequencies than the operating frequency after the starting up period.

For several of the applications cited above, it is useful to provide means enabling the reversal of the rotating direction of the phases and hence the reversal of the direction of movement of the rotor. Thus, the most adequate rest position may be reached or the direction of movement of which the torque is the smallest may be chosen.

The torque of an asynchronous motor is a function of the voltage and of the frequency of the power distribution system. More particularly, the torque is proportional to $1/f$ ($f$ being the energizing frequency of the motor) when the motor is in synchronism, that is, when the slip is very slight. The torque is proportional to $1/f^3$ during starting up, that is, when the slipping is very great and it reaches a maximum for an intermediate slip value which gives a proportionality factor equal to $U^2/f^2$, ($U$ being the supply voltage of the motor).

For lifting motors, manufacturers generally place the maximum torque in the vicinity of the starting up.

The supply system according to the present invention therefore makes it possible to supply low-speed asynchronous motors from a low-voltage and low-power direct current source, which may be either a storage cell battery having low internal resistance or low voltage alternating current source accompanied by a rectifier. It is possible, in many cases, to use frequencies in the vicinity of a tenth of the frequency of the power distribution system without encountering technological difficulties. A difficulty arises when the speed of the motor running idle becomes lower than the slip speed which is independent of the frequency. A supply frequency too close to the reasonance frequency of the motor must also be avoided, but, in general, that frequency is still lower than the minimum frequency fixed by the slip.

Other objects and features of the invention will be described hereinafter in detail with reference to two embodiment examples and accompanying six figures of drawings, wherein:

FIG. 1. shows a general block diagram of a system embodying the invention;

DETAILED DESCRIPTION

Figure 1:
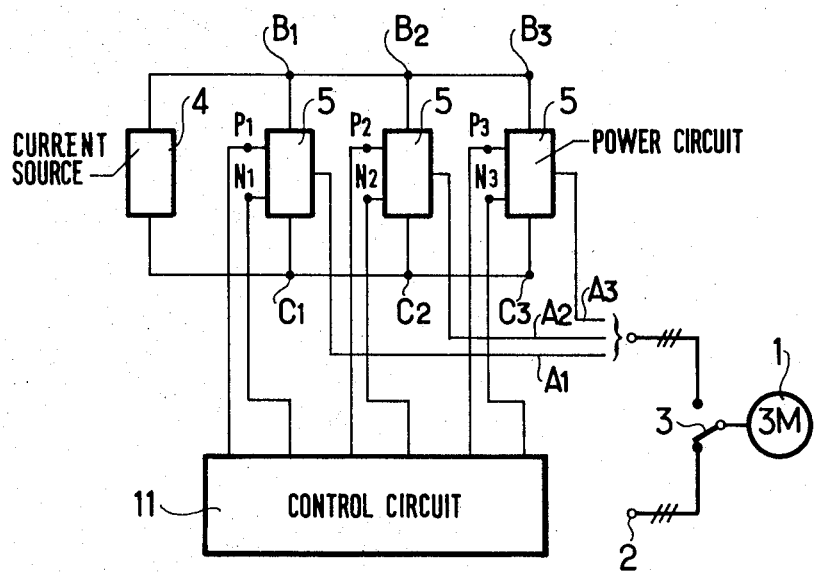

Referring to the drawings and first to FIG. 1, a three-phase synchronous motor 1, which is supplied during normal operation, by a three-phase 200 volt 50 c/s power distribution system 2 is depicted.

A multiplex switch 3 makes it possible to cut off the connection between that a.c. power distribution system 2 and the motor 1 and to establish an electrical connection with an auxiliary current supply system. This supply system is mainly composed of a direct current source 4, for example, a battery or rectified a.c. and an undulator S whose three outputs $A_1$, $A_2$ $A_3$ provide a three-phase voltage, 24 volts, peak to peak, 6 c/s voltage, for example.

Because of the comparatively lower frequency of the auxiliary supply system, the motor rotates at a lower speed, but on the other hand, the torque which the motor develops is practically identical to that which is observed in the case of normal operation. Thus, with a relatively low power source, it is possible to operate at a lower speed and in certain cases, to end the motor movement and reach a suitable rest position.

The undulator S is composed of a control circuit 11 and of a power circuit which comprises three identical components 5 corresponding to three phases.

Figure 2:
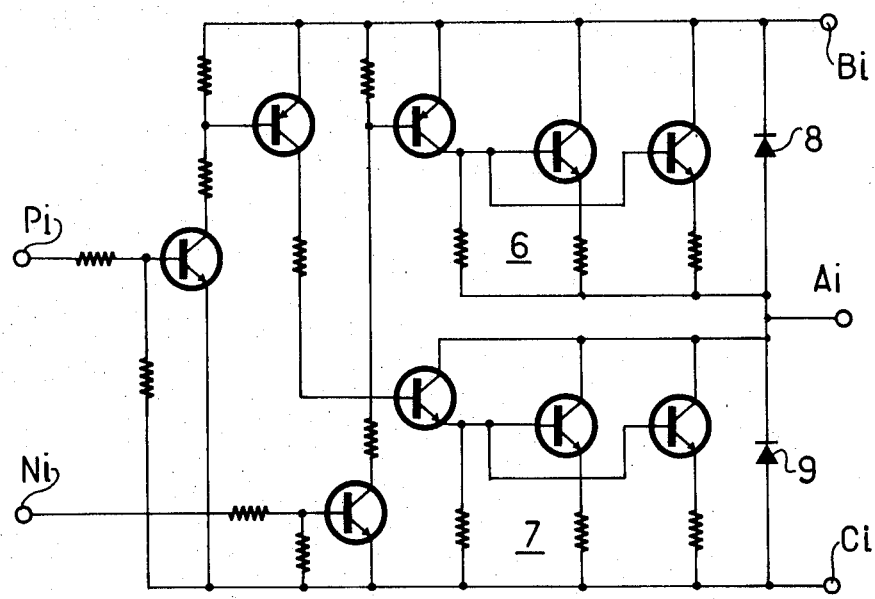
FIG. 2 shows the diagram of the power circuit of the undulator or oscillator according to the invention.

For each component 5 of the power circuit corresponding to the phase $i$ ($i$ = 1,2 or 3) FIG. 2 shows a positive P$i$, and a negative input N$i$ from control circuit 11 and an output A$i$, the latter being connected to the switch 3. FIG. 2 shows in detail a transistorized embodiment of one of the three like components 5 according to FIG. 1. Each power circuit comprises two branches 6 and 7 which are substantially identical, composed of amplification transistors 50, 52 and 54, 56 58 respectively and of the two power transistors, 60, 62 and 64, 66 respectively. The two inputs P$i$, N$i$ provided by control circuit 11 as hereinafter described are complements of each other, i.e., when one is at a high voltage, logic ONE, the other is at a low voltage logic ZERO. The branches 6 and 7 are connected essentially in a push-pull arrangement, such that they are alternately conductive, that is, the output A$i$ is connected to the positive terminal B$i$ through power transistors 60 and 62 when N$i$ is at a logical ONE and to the negtive terminal $C_1$, through power transistors 64 and 66 when P$i$ is a logic ONE. The circuit resistor values, transistor types and supply voltage at B$i$ and C$i$ requirements will depend on the particular motor characteristics and are readily determined by one skilled in the art at installation.

The respective pairs of power transistors are shunted respectively by reverse supply diodes 8 and 9, reverse connected, which becomes conductive when the motor operates and produces over-voltage at the terminal A$i$. In that circumstance, power is sent back to the source.

The points B$i$ and C$i$ are connected to the positive and negative terminals respectively of the direct current source 4.

Figure 3:
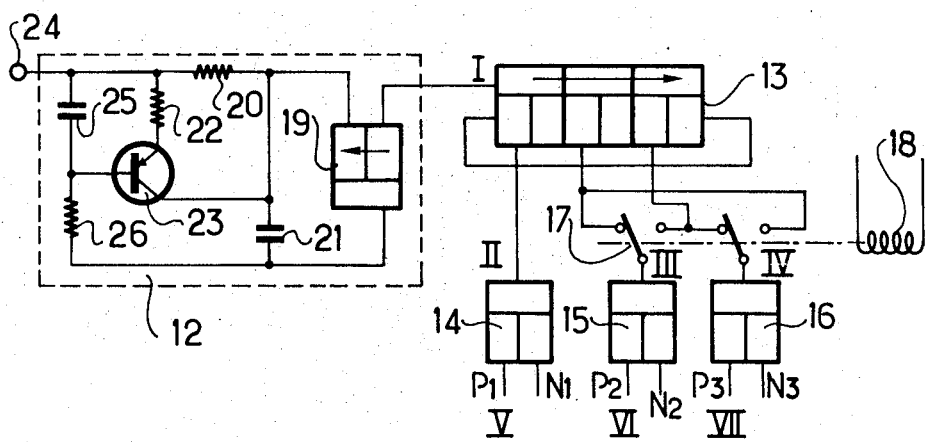
FIG. 3 shows a logic diagram of the control circuit of the undulator according to the invention.

The inputs P$i$ and N$i$ are connected to the control circuit 11 which is shown in detail in FIG. 3.

The control circuit 11, shown in detail in FIG. 3, contains a circuit called the "time base circuit," 12, which sends out a regular rhythm of pulses with a frequency of about 36 c/s. This pulse train is represented by the diagram I in FIG. 4. The circuit called the "time base circuit" will be described in detail hereinafter.

Figure 4:
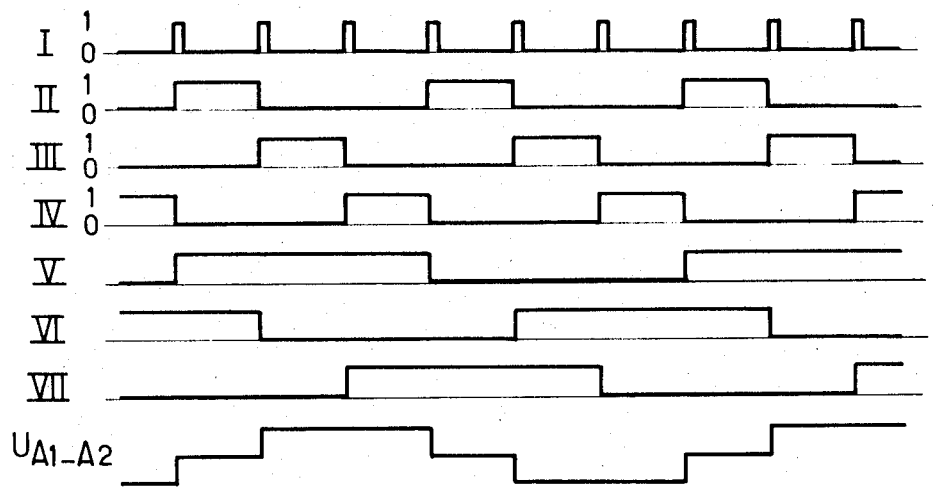
FIG. 4 shows a few representative curves describing the operation of the circuit according to FIG. 3.

The pulse train from time base circuit 12 is sent to a cyclic shift register 13 having three binary units whose output is connected to the input so as to allow a logic ONE to circulate endlessly at the speed of the input pulse trains. An output of each binary unit of the shift register 13 is connected to one of the bistable flip-flops 14, 15 and 16 respectively, which changes its binary state each time it receives a positive rising wave front at its input. The signals at the input of these three flip-flops are shown in FIG. 4 by the diagrams II, III and IV and the signals they send out at their positive output are shown in diagrams V, VI and VII respectively. It should be observed that the resetting of register 13 and three flip-flops 14 and 16 at the time when the motor supply current is switched from the main power system to the auxiliary system has been omitted for clarity purposes. By definition, at the time of reset, the output of the first binary unit of register 13 is at a logic ONE and the other two are at a logic ZERO. Also, at this time, flip-flops 14 and 16 are reset to ZERO and flip-flop 15 reset to ONE. Circuitry familiar to those skilled in the art, can be designed to implement this reset function.

The three flip-flops provide, beside the positive outputs P1, P2 and P3 respectively, negative or complementary outputs N1, N2 and N3 respectively, whose signals are always logically reversed in relation to the positive signals. These outputs are connected to their respective control inputs of the power circuit according to FIG. 2.

It can be observed, on examining FIG. 2 and tracing the signal flow therethrough because the two branches are alternately conductive, that is, that the output $A_1$, $A_2$ or $A_3$ respectively is connected either to the positive terminal or the negative terminal of the battery, the signals shown in the diagrams V, VI and VII are representative not only of the logic state of the three flip-flops but also represent in form the voltage of the output A$i$ of the undulator or low frequency oscillator. The last diagram in FIG. 4 shows the differential voltage between the two output terminals $A_1$ and $A_2$ of the undulator, which is composed directly by the difference between the two output voltages at the terminals $A_1$ and $A_2$, shown in diagrams V and VI. The same considerations may be applied to the other phases and it is observed that the three differential signals are dephased by 120° in relation to each other. The maximum voltage corresponds practically to the voltage of the direct current source 4 and the frequency is six times smaller than the frequency of the circuit 12 called the "time base circuit."

Up until now, it has been considered that the shift register be directly connected to these three flip-flops 14, 15 16, this being justifed if only one direction of rotation of the vector of the three phase system is required. Sometimes, however, it is required to provide the opposite direction of rotation so as to be able to reverse the direction of rotation of the asynchronous motor.

This reversing may, for example, be effected at the level of the shift register whose shift direction could be reversed. Nevertheless, a simpler solution is shown diagrammatically in FIG. 3 and consists in crossing the connections of two binary units at the input of the flip-flops 15 and 16. To do this, all that is needed is that a reversing relay 17 which is controlled by a control signal applied to the relay winding 18 be provided. As a function of the position of the contacts of that relay, the last two shift units are thus connected to the flip-flops 15 and 16 in the order drawn or else in a cross order when the relay 17 is operated.

It is known that at starting up of the motor the torques should, in many cases, be greater than the torques which are observed when the slipping of the motor is at its minimum and that these torques increase when the supply frequency decreases. With a view to providing a greater torque at the starting up, the circuit called the "time base circuit 12" shown in FIG. 3 has been equipped with means for providing the pulse trains with a progressively increasing frequency reaching, at the end of the operating frequency, a value of 36 c/s. Instead of a multivibrator, a monostable flip-flop 19, which becomes an oscillator through the connection to an external negative feedback circuit is used. That negative reactive impedance comprises a resistor 20 and a capacitor 21 which define, during the starting up, the oscillation period. It comprises, moreover, a resistor 22 in series with a transistor 23 which, together, shunt resistor 20. The base of transistor 23 is connected to a terminal 24 for the supply voltage through a capacitor 25 which, at the applying of voltage to the terminal 24, makes the transistor 23 non-conductive during a certain period and thus disconnects the resistor 22 from being in parallel with resistor 20. When the transistor 23 becomes progressively conductive with a time constant defined by a capacitor 25 and the base resistor 26, the emitter resistor 22 enables the progressive increase of the oscillator frequency, starting from the starting up frequency which is of approximately 10 c/s up until the operation frequency which is arrived at after a few seconds.

Figure 5:
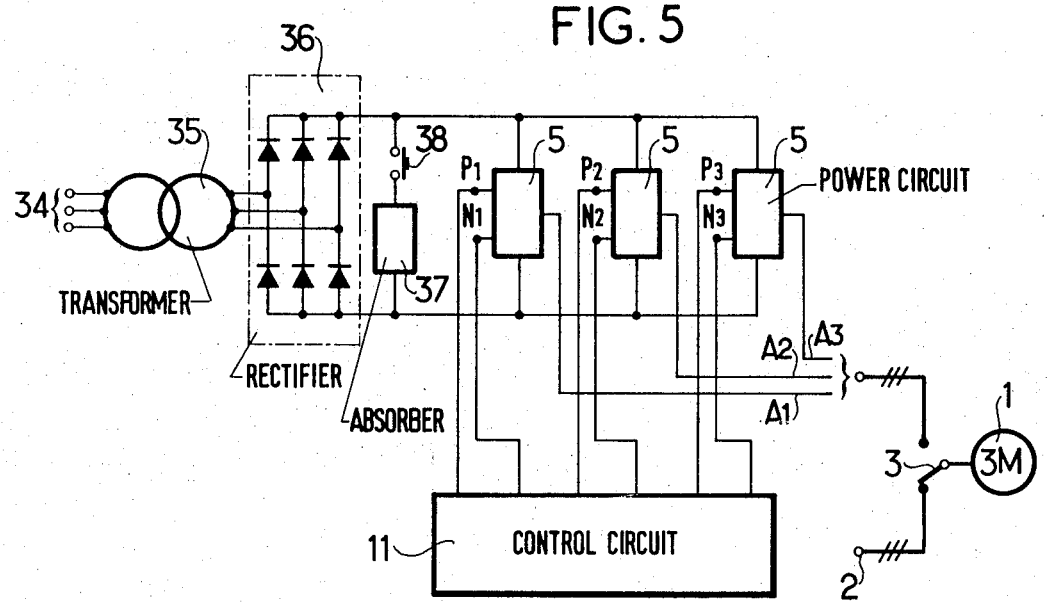
FIG. 5 shows a general diagram of an embodiment of the circuit in FIG. 1.

FIG. 5 shows an embodiment of the circuit diagram according to FIG. 1, in which the battery 4 of FIG. 1 is replaced by a direct current source which embodies an alternating current source and transformer 35 followed by a rectifier 36 and in which like operating components of FIGS. 1 and 5 beyond the rectifier 36 bear the same references as in FIG. 1.

The three-phase asynchronous motor 1 which is supplied, during normal operation, by a three-phase 220 volt 50 c/s power distribution system is shown. In low-speed operation, the motor is switched by means of a multiplex switch 3 to a three-phase system like that of FIG. 1 having output terminals $A_1$, $A_2$, $A_3$ delivering as in FIG. 1 an appreciably lower frequency and voltage. The voltages at the terminals A1, A2, A3 are derived from a three-phase power distribution system 34 through the transformer 35, the rectifier 36 and embodying an undulator identical in circuitry with that of FIG. 1. This three-phase power distribution system 34 may be the normal power distribution system 2.

The undulator again comprises the three power circuits, each like that of FIG. 2, which connect up to one of the outputs A1 alternately the two terminals of the rectifier 36 under the control of complementary signals applied to the control inputs Pi and Ni. These signals are produced in the control circuit 11 which comprises a circuit 12 called a "time base circuit" as has been described with reference to FIGS. 2 and 3.

This system of FIG. 5 may be used for electrical braking. The power provided by the motor 1 operating as a generator may be absorbed by the undulator. Moreover, it is possible to connect an absorber 37 in parallel with the rectifier 36. This absorber 37 may be a resistor or a storage call battery. To avoid a continuous charge of such a battery or a loss of power in a resistance absorber when the motor operates normally, the absorber is connectable to the circuit only through a switch 38.

Morevoer, the absorber 37 if a battery may be used for providing the emergency power of the system in the case of a breakdown of the power distribution system.

This embodiment is applied, to great advantage, to a handling system (crane, bridge, etc.) which operates at a cruising speed and which uses a reduced speed for delicate movements, for example, for approaching or drawing alongside.

Figure 6:
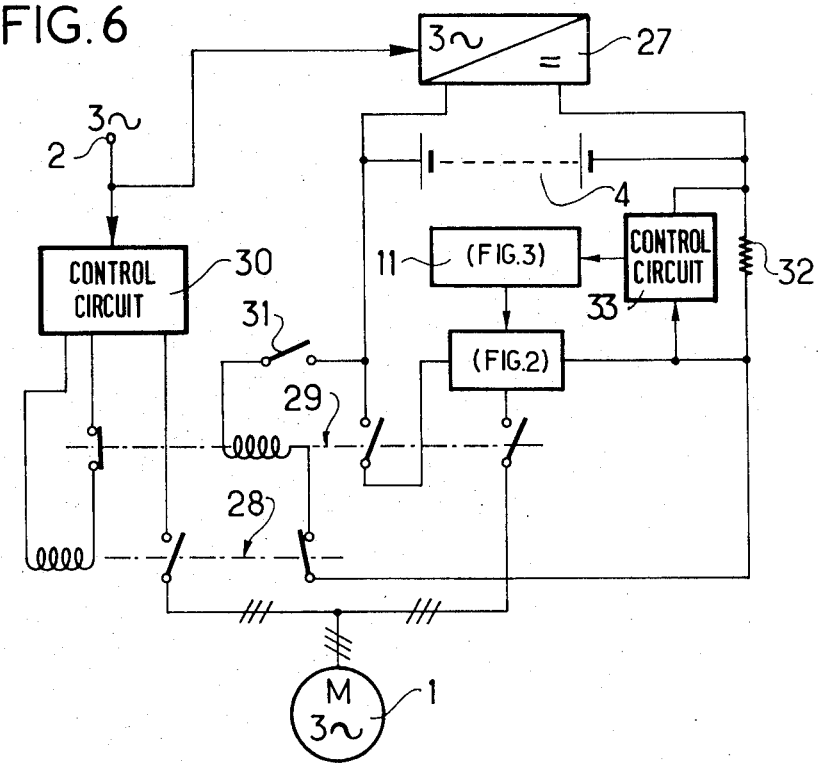
FIG. 6 shows the emergency installation of a lift, applying the device according to the invention.

FIG. 6 shows the application of an emergency device according to FIG. 1 for an elevator. Here, the direct current source 4, is a battery and the undulator consisting of the power circuits according to FIG. 2 and the control circuit 11 which is shown in detail in FIG. 3 are again shown. The three-phase asynchronous motor 1 constitutes the main driving motor of an elevator cabin which latter it not shown. During normal operation, this motor is supplied through a control block 30 by the three-phase 220 V 50 c/s power distribution system 2. That same network also feeds a charger 27 whose rectified output keeps the battery charged outside the emergency periods. The switch 3 of FIG. 1 is replaced here by a system of two contact switches 28 and 29 which are mechanically and electrically locked in relation to one another to prevent them from both being energized simultaneously.

One of the contact switches 28 is energized directly by the power of the distribution system 2; during the energizing thereof, it cuts off the supply of the other contact switch 29 and connects up the power distribution system through the control block 30 on the motor.

The contact switch 29 is supplied by the emergency battery 4 when the power distribution fails (contact switch 28 de-energized) and a contact 31 is closed automatically as a result of the lack of power distribution from source 2. By three sets of contacts the contact switch 29 disconnects the supply of the contact switch 28, energizes the undulator and connects the output of the latter to the motor 1.

One particular aspect of this installation is constituted by the fact that the reversal of the direction of rotation is obtained automatically when the starting up of the cabin in one direction requires of the battery a current which exceeds a chosen thershold. By that method, the reverse of the direction is ensured in the case where the load of the elevator will not allow starting up in a predetermined direction. A measurement shunt circuit 32 is connected up between the battery 4 and the undulator. The drop in voltage at the terminals of this shunt 32 is supplied to a direction control circuit 33 which produces the direction reversing signal (applied to the winding 18 in FIG. 3).

The direction control circuit 33 may comprise a threshold amplifier and a bistable element which changes its binary state as soon as the voltage on the shunt 32 exceeds a predetermined threshold. It can, moreover, comprise a time delay element which delays the energizing of the circuit to remove the effect of the inrush current on starting up.

The supply devices which have been described above constitute only examples of embodiments of the invention. It is clear that the control circuit according to FIG. 3 may be modified inasmuch as concerns its logic structure and may be embodied in practice according to several possible conditions. It is also possible to provide, between the outputs of the flip-flops 14, 15 and 16 and the input of the power circuit, amplifier stages if it is necessary to do so. The embodiments of the invention are not restricted to safety conditions nor to interlocking means required for certain applications. It is possible, by way of example, to make the starting up of the emergency system dependent on certain safety conditions, which may be constituted in the case of a lift by the closing of the story contacts, gate contacts and end of run contacts. Thus, variations within the scope of the appended claims are possible and are contem-

What is claimed is:

1. A supply system for an asynchronous motor which comprises: a main alternating current supply of given output, an auxiliary a.c. supply system including, a direct current supply and undulator means connected to said d.c. supply to provide an output from said auxiliary a.c. supply that has an output frequency and voltage both substantially lower than the output frequency and voltage of said first a.c. supply, and means for connecting alternately either one of said supplies to said motor.

2. The system of claim 1 wherein the ratio of the output voltage to the frequency of said auxiliary supply is substantially identical to the ratio of the output voltage to the frequency of said main a.c. supply.

3. The system of claim 1 wherein said auxiliary supply includes means to enable absorption of overvoltages produced by said motor.

4. The system of claim 1 wherein said d.c. supply is a battery and wherein said auxiliary supply means includes means to enable said battery to be recharged when said motor operates as a generator.

5. The system of claim 4 wherein said means enabling recharging includes at least one diode reversely connected to the output of said auxiliary supply, said diode having sufficient current carrying capacity to handle the whole current that can be supplied by said motor.

6. The system of claim 1 wherein said undulator means includes a time base circuit, said time base circuit having a first frequency determining means for setting an initial value of the initial output frequency when said auxiliary supply is first connected to said motor and second frequency determining means for varying said first-named output frequency from said initial value to a final value.

7. The system of claim 1 wherein said motor is a polyphase motor and wherein said auxiliary a.c. system is a polyphase system including means for reversing the phases of the outputs of said auxiliary system.

8. A supply system for an asynchronous motor according to claim 1 wherein said undulator means includes control circuit means providing two inputs which are complements of each other connected in a push-pull arrangement so as to be alternatively conductive.

9. A supply system for an asynchronous motor having two directions of rotation which comprise a main alternating current supply, an auxiliary a.c. supply which includes a direct current supply and undulator means connected to said a.c. supply, said auxiliary a.c. supply having an output frequency and voltage substantially lower than the output frequency and voltage of said first supply, means for connecting alternately either one of said supplies to said motor, said undulator means including a time base circuit, said time base circuit having a first frequency determining means for setting an initial output frequency when said auxiliary supply is first connected to said motor and second frequency determining means for varying said initial output frequency from said initial value to a final value, means connected between said d.c. supply and said undulator for detecting when the current drawn from said d.c. supply exceeds a threshold value, and means responsive to said detection means for causing a change in the direction of rotation of said motor when said direction means indicates said threshold has been exceeded.

10. A supply system for an asynchronous motor according to claim 9, wherein said undulator means includes also control circuit means providing two inputs which are complements of each other.

11. A supply system for an asynchronous motor according to claim 1 wherein said motor is a three-phase motor, said main a.c. supply is also three-phase, and said auxiliary a.c. supply system has three terminals providing output current of low frequency and low voltage and said undulator includes three like power circuits, each of said last-named currents including a control circuit providing positive and negative inputs and a pair of branches, each connected respectively to a positive input and a negative input from said control circuit, said branches each comprising amplification transistors and power transistors in parallel, said last-named inputs being effective to effect the said two branches in complementary manner so that when the power transistors in one branch are conductive the power transistors of the other one of said branches are non-conductive, and each said pair of branches also being connected to terminals of said d.c. current supply.

12. A supply system for an asynchronous motor according to claim 11 including reverse supply diodes for each branch reversely connected to be conductive when the motor operates and produces over-voltages at the three terminals of the auxiliary a.c. supply system.

13. A supply system for an asynchronous motor according to claim 1 wherein said d.c. supply is a battery.

14. A supply system for an asynchronous motor according to claim 1 wherein said d.c. supply comprises an a.c. supply and a rectifier connected therewith to convert the last-named a.c. supply to said direct current supply.

15. A supply system for an asynchronous motor according to claim 14 wherein said last-named a.c. supply is derived from said main a. supply.

16. A supply system for an asynchronous motor according to claim 1 including a time base circuit providing a regular rhythm of pulses at a lower frequency than the frequency of said main a.c. supply and bistable flip-flops which change binary state on each reception of a positive rising wave front from the pulses of said time base circuit.

17. A supply system for an asynchronous motor according to claim 16 wherein each of said flip-flops has a positive output providing a signal and a complementary negative output providing a signal that is logically reversed in relation to the signal provided by said positive output.

18. A supply system for an asynchronous motor according to claim 16 including cyclic shift register means comprising binary units connected to receive pulses from said time base circuit, each said binary unit being connected to a different one of said flip-flops.

19. A supply system for an asynchronous motor according to claim 16 wherein said time base circuit includes means to provide said pulses at a progressive increasing frequency from motor start-up to full motor operating conditions.

20. A supply system for an asynchronous motor according to claim 19 wherein said last-named means comprises a monostable flip-flop connected to a negative impedance to serve as an oscillator, said negative impedance comprising a condenser and a resistor which provide said pulses at motor start up, and a transistor, a resistor and a second condenser connected to provide a time constant to render the transistor progressively conductive and thereby provide said progressive increase in the frequency of said pulses.

21. A supply system for an asynchronous motor comprising an alternating current supply source connectable to said motor for normal alternating current supply thereto, a direct current system and source and an oscillator in combination with said direct current system, said oscillator oscillating at an inherent frequency which is lower than the frequency of said normal alternating current source and having an output voltage which is a fraction of the voltage of the normal alternating current supply.

22. A supply system according to claim 21 wherein the ratio between output voltage of the oscillator and its frequency is approximately identical with the ratio between the voltage and frequency of the said alternating current supply source.

23. The supply system according to claim 21 including means in said oscillator to enable absorption of over-voltage produced by the motor.

24. The supply system according to claim 21 wherein said direct current source is a battery, and means enabling recharging of the battery when said motor operates as a generator.

25. The supply system according to claim 21 wherein said oscillator includes power switching means having output terminals connectable to said motor and also includes means enabling recharging of the battery when said motor operates as a generator, said last-named means comprising diodes reversely connected to said terminals, said diodes having current carrying capacities enabling flow of the whole current by the motor.

26. The supply system according to claim 21 wherein said oscillator includes a time base circuit, said time base circuit comprising starting-up means enabling said circuit to operate at frequencies lower than normal operating frequencies during an initial period after energization of said system and to reach said operating frequency subsequently.

27. The supply system according to claim 21, wherein said motor is of poly-phase type and said oscillator includes means enabling the reversal of direction of rotation of the phases.

28. The combination with a device driven by an asynchronous motor having two directions of rotation comprising a supply system for said motor, said system comprising an alternating current source connectable to said motor for normal alternating current supply thereto, a direct current source and an oscillator in combination with said direct current source to provide auxiliary emergency operating a.c. current for said motor, said oscillator oscillating at an inherent frequency which is lower than the frequency of said normal alternating current source and having an output voltage which is a fraction of the voltage of the normal alternating current supply source and said oscillator comprising a time base current including starting-up means enabling said time base circuit to operate at frequencies lower than normal operating frequencies during an initial period after energization of said system and subsequently and progressively to reach said normal operating frequency.

29. In the combination according to claim 28 wherein said supply system is connected to said motor so that the latter can be operated at two different speeds, one being a cruising speed of said motor and the other an approach or alignment speed.

30. In the combination according to claim 28, means to prevent simultaneous delivery to said motor of current from said a.c. source and of current derived from said direct current source.

* * * * *